(No Model.)
G. VOELKER.
COMBINED STOOL AND BICYCLE SADDLE.
No. 575,184. Patented Jan. 12, 1897.
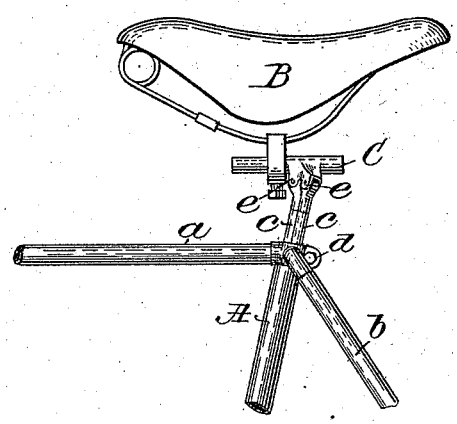
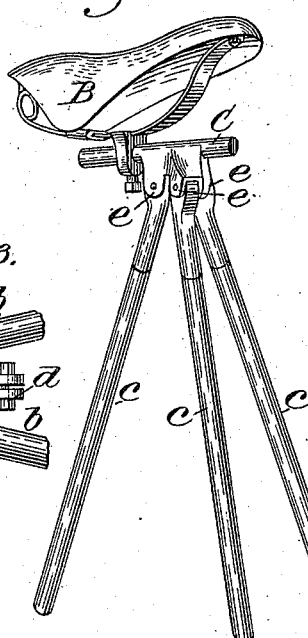
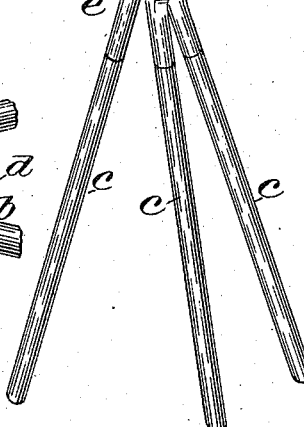
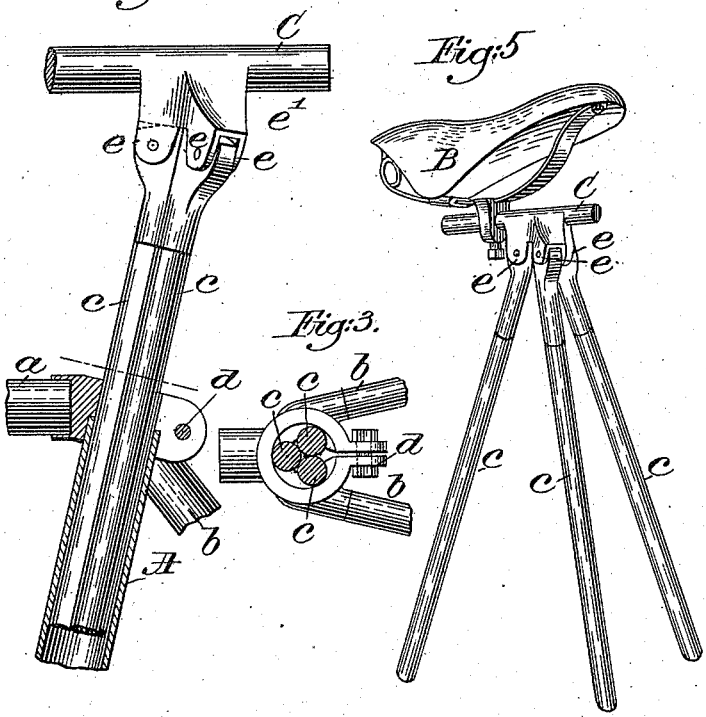
Witnesses.
Fred. S. Greenleaf
Geo. L. Cook.
Inventor.
George Voelker.
by N. A. Lombard
attys.

UNITED STATES PATENT OFFICE.

GEORGE VOELKER, OF SOMERVILLE, MASSACHUSETTS.

COMBINED STOOL AND BICYCLE-SADDLE.

SPECIFICATION forming part of Letters Patent No. 575,184, dated January 12, 1897.

Application filed August 4, 1896. Serial No. 601,591. (No model.)

*To all whom it may concern:*

Be it known that I, GEORGE VOELKER, of Somerville, in the county of Middlesex and State of Massachusetts, have invented a new and useful Combined Stool and Bicycle-Saddle, of which the following, taken in connection with the accompanying drawings, is a specification.

My invention relates to a combined stool and bicycle-saddle; and it consists in certain novel features of construction, arrangement, and combination of parts, which will be readily understood by reference to the description of the accompanying drawings, and to the claims hereto appended, and in which my invention is clearly pointed out.

Figure 1 of the drawings is a side elevation of a bicycle saddle and support embodying my invention. Fig. 2 is a similar view of the saddle-support, drawn to an enlarged scale. Fig. 3 is a sectional plan, the cutting plane being on line $x\ x$ on Fig. 2. Fig. 4 is an elevation of a portion of one of the legs of the saddle-support or stool, and Fig. 5 is an elevation of my improved saddle and supporter removed from the bicycle and converted into a stool.

In the drawings, A, $a$, and $b$ represent portions of a bicycle-frame.

B represents the saddle; C, the saddle-supporting bar, having pivoted thereto three legs $c\ c\ c$, so arranged relative to each other that when in positions parallel to each other they are all in contact with each other throughout their entire length and may all be slipped into the tubular upright A of the frame and be clamped in any desired position therein by the clamping-bolt $d$, when the saddle will be held firmly in place until such time as it is desired to readjust it for any purpose.

Any style of saddle may be secured to the bar C and the saddle-supporting legs may be applied to any bicycle having a tubular upright and clamping-ring to receive the saddle-supporting shank.

When the rider becomes tired of riding and desires to rest, he can remove the saddle-support from its socket, spread the legs till the inclined portions of their upper ends come in contact with the surface of the metal between the ears $e\ e$, as at $e'$, and he has a convenient and comfortable stool, upon which he or she can sit at ease until rested.

What I claim as new, and desire to secure by Letters Patent of the United States, is—

1. The combination with the tubular upright A and saddle or seat of a bicycle; of a saddle-supporting head or bar provided with a plurality of pairs of ears in close proximity to each other; a shank made in a plurality of parts, divided longitudinally, and each pivoted to a separate pair of said ears, and arranged to contact with each other and fit into the socket of said tubular upright, and to be movable about their pivots when removed from said socket; and means for adjustably and removably securing said saddle to said head or bar.

2. As an article of manufacture, the combination of a bicycle-saddle provided with a clip or socket to receive its supporting-bar; the bar C provided with a plurality of pairs of ears $e$, $e$; a shank formed of a plurality of parts $c$, $c$, each pivoted to a separate pair of said ears, and arranged to contact with each other, or to be adjusted to divergent positions, and each having its upper end formed of two flat planes at an angle to each other, to serve as stops to limit the movement of said parts in either direction.

In testimony whereof I have signed my name to this specification, in the presence of two subscribing witnesses, on this 3d day of August, A. D. 1896.

GEORGE VOELKER.

Witnesses:
N. C. LOMBARD,
L. C. GREENLEAF.